US008269595B2

(12) United States Patent
Okada et al.

(10) Patent No.: US 8,269,595 B2
(45) Date of Patent: Sep. 18, 2012

(54) COIL UNIT AND ELECTRONIC INSTRUMENT (75) Inventors: Hirofumi Okada, Suwa (JP); Yoichiro Kondo, Chino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/170,728

(22) Filed: Jul. 10, 2008

(65) Prior Publication Data
US 2009/0015362 A1   Jan. 15, 2009

(30) Foreign Application Priority Data
Jul. 11, 2007   (JP) .................................. 2007-182371

(51) Int. Cl.
H01F 5/00 (2006.01)
H01F 27/02 (2006.01)
H01F 27/28 (2006.01)
H01F 27/24 (2006.01)

(52) U.S. Cl. ............ 336/200; 336/90; 336/96; 336/232; 336/233

(58) Field of Classification Search .................... 336/90, 336/200, 232, 233, 96
See application file for complete search history.

(56) References Cited

U.S. PATENT DOCUMENTS

| | | | |
|---|---|---|---|
| 3,119,084 A * | 1/1964 | Sutton, Jr. ......................... 336/92 |
| 3,798,059 A | 3/1974 | Astle et al. | |
| 5,621,636 A * | 4/1997 | Tanigawa et al. .............. 363/147 |
| 5,847,947 A | 12/1998 | Pan et al. | |
| 6,008,622 A | 12/1999 | Nakawatase | |
| 6,265,789 B1 * | 7/2001 | Honda et al. ..................... 307/33 |
| 6,437,673 B1 * | 8/2002 | Nishida et al. .................. 336/90 |
| 6,522,233 B1 * | 2/2003 | Kyoso et al. ..................... 336/200 |
| 6,774,755 B2 * | 8/2004 | Nakata et al. .................... 336/83 |
| 6,956,166 B2 * | 10/2005 | Kishimoto ....................... 174/559 |
| 7,176,423 B2 | 2/2007 | Kataoka et al. | |
| 2002/0050907 A1 * | 5/2002 | Szu-Lu et al. ................. 336/192 |
| 2002/0067237 A1 | 6/2002 | Nakata et al. | |
| 2003/0020583 A1 * | 1/2003 | Hui et al. ......................... 336/200 |
| 2003/0058075 A1 * | 3/2003 | Iwao et al. ....................... 336/94 |
| 2004/0000974 A1 | 1/2004 | Odenaal et al. | |
| 2005/0189910 A1 * | 9/2005 | Hui .................................. 320/108 |
| 2006/0266435 A1 * | 11/2006 | Yang et al. ...................... 148/105 |
| 2006/0267854 A1 * | 11/2006 | Naito ............................... 343/788 |

(Continued)

FOREIGN PATENT DOCUMENTS
EP   1 096 641 A   5/2001
(Continued)

OTHER PUBLICATIONS
U.S. Appl. No. 12/071,255, filed on Feb. 19, 2008; Kondo et al.
(Continued)

*Primary Examiner* — Mohamad Musleh
*Assistant Examiner* — Tsz Chan
(74) *Attorney, Agent, or Firm* — Oliff & Berridge, PLC (57) ABSTRACT

A coil unit includes a planar coil, a coil-receiving housing having a depression that receives the planar coil, the planar coil being disposed in the coil-receiving housing so that a transmission side of the planar coil faces a bottom of the depression, and a substrate having a mounting surface that is provided with a mounted component and faces a non-transmission side of the planar coil, an inner end lead line and an outer end lead line of the planar coil being connected to the substrate. The substrate is secured as a lid of the coil-receiving housing on an open end side of the depression of the coil-receiving housing.

11 Claims, 6 Drawing Sheets

U.S. PATENT DOCUMENTS

2007/0090790 A1 * 4/2007 Hui .............................. 320/108

FOREIGN PATENT DOCUMENTS

| | | | | |
|---|---|---|---|---|
| EP | 1 487 082 A | | | 12/2004 |
| JP | 03227004 A | * | | 10/1991 |
| JP | A-05-083173 | | | 4/1993 |
| JP | U-07-027871 | | | 5/1995 |
| JP | A-09-204506 | | | 8/1997 |
| JP | 2002052004 A | * | | 2/2002 |
| JP | A-2003-272938 | | | 9/2003 |
| JP | A-2004-208383 | | | 7/2004 |
| JP | 2004304370 A | * | | 10/2004 |
| JP | 2006042519 A | * | | 2/2006 |
| JP | A-2006-060909 | | | 3/2006 |

OTHER PUBLICATIONS

Nov. 25, 2009 European Search Report issued in EP 08012386.

* cited by examiner

COIL UNIT AND ELECTRONIC INSTRUMENT

Japanese Patent Application No. 2007-182371 filed on Jul. 11, 2007, is hereby incorporated by reference in its entirety.

BACKGROUND OF THE INVENTION

The present invention relates to a coil unit utilized for non-contact power transmission using a coil, an electronic instrument, and the like.

In recent years, non-contact power transmission (contactless power transmission) that utilizes electromagnetic induction to enable power transmission without metal-to-metal contact has attracted attention. As application examples of non-contact power transmission, charging a portable telephone, charging a household appliance (e.g., telephone handset), and the like have been proposed.

JP-A-2006-60909 discloses related-art non-contact power transmission. In JP-A-2006-60909, a series resonant circuit is formed using a resonant capacitor connected to the output of a power transmission driver and a primary coil so that power is supplied from a power transmission device (primary side) to a power reception device (secondary side).

When performing non-contact power transmission, it is necessary to provide coil units in a primary-side instrument and a secondary-side instrument. In particular, when providing a coil unit in a small instrument, the coil unit is desired to have a reduced size. The coil unit is also desired to have a shape that allows easy handling as a component of the instrument. Moreover, it is necessary to prevent a situation in which a foreign object enters the coil unit and causes an electrical malfunction.

Several aspects of the invention may provide a coil unit that allows easy handling as a component and prevents entrance of a foreign object, and an electronic instrument using the coil unit.

SUMMARY

According to one aspect of the invention, there is provided a coil unit comprising:

a planar coil;

a coil-receiving housing having a depression that receives the planar coil, the planar coil being disposed in the coil-receiving housing so that a transmission side of the planar coil faces a bottom of the depression; and a substrate having a mounting surface that is provided with a mounted component and faces a non-transmission side of the planar coil, an inner end lead line and an outer end lead line of the planar coil being connected to the substrate, the substrate being secured as a lid of the coil-receiving housing on an open end side of the depression of the coil-receiving housing.

According to another aspect of the invention, there is provided a coil unit comprising:

a coil;

a coil-receiving housing having a depression that receives the coil; and a base provided with an electronic component that is electrically connected to the coil, the base being disposed to cover the depression.

According to another aspect of the invention, there is provided an electronic instrument comprising each of the above coil unit.

DETAILED DESCRIPTION OF THE EMBODIMENT

According to one embodiment of the invention, there is provided a coil unit comprising:

a planar coil;

a coil-receiving housing having a depression that receives the planar coil, the planar coil being disposed in the coil-receiving housing so that a transmission side of the planar coil faces a bottom of the depression; and a substrate having a mounting surface that is provided with a mounted component and faces a non-transmission side of the planar coil, an inner end lead line and an outer end lead line of the planar coil being connected to the substrate, the substrate being secured as a lid of the coil-receiving housing on an open end side of the depression of the coil-receiving housing.

According to one embodiment of the invention, since the coil is covered with the coil-receiving housing and the substrate, the planar coil of the coil unit is not exposed. Therefore, the coil unit allows easy handling as an electrical component. Moreover, since a hole need not unnecessarily be formed in the coil-receiving housing, the space that receives the planar coil is covered with the coil-receiving housing and the substrate so that a foreign object does not enter the coil unit from the outside. Although mounted components and mounting patterns are provided in the inner space of the coil-receiving housing in addition to the planar coil, an electrical malfunction due to entrance of a metal foreign object rarely occurs.

In the coil unit according to this embodiment, the inner end lead line of the planar coil may be provided on the transmission side; and a receiving section that receives the inner end lead line may be provided in the bottom of the coil-receiving to housing. According to this configuration, the thickness of the inner end lead line of the planar coil does not affect the height of the coil unit, or the effect of the thickness of the inner end lead line of the planar coil on the height of the coil unit can be reduced. Therefore, the size of the coil unit can be reduced.

In the coil unit according to this embodiment, the planar coil may have an air-core section; and the coil-receiving housing may have a positioning protrusion that positions the air-core section of the planar coil.

According to this configuration, the planar coil can be positioned by utilizing the air-core section of the planar coil.

In the coil unit according to this embodiment, the coil unit may further include a magnetic sheet disposed on the non-transmission side of the planar coil, the planar coil and the magnetic sheet may be placed between the coil-receiving housing and the substrate.

The magnetic sheet receives a magnetic flux from the planar coil and increases the inductance of the planar coil.

In the coil unit according to this embodiment, the coil unit may further include a magnetic shield sheet, the magnetic shield sheet being stacked on the magnetic sheet on a side that faces the mounting surface of the substrate.

The magnetic shield sheet absorbs a magnetic flux which has not been absorbed by the magnetic sheet so that an adverse effect of the magnetic flux on the mounted components provided on the substrate can be prevented.

In the coil unit according to this embodiment, a sealing material may be provided between an outer edge of the magnetic sheet and an inner wall of the coil-receiving housing; and the inner end lead line and the outer end lead line of the planar coil may be connected to the substrate through the sealing material.

This enables the end of the magnetic sheet to be covered, or enables a path in which the material for the magnetic sheet is situated to be sealed. This prevents a situation in which a metal foreign object falls onto the mounting surface of the substrate so that electrical problems such as a pattern short circuit can be prevented.

In the coil unit according to this embodiment, connection patterns connected to the inner end lead line and the outer end lead line may be provided on an exposed surface of the substrate opposite to the mounting surface; a recess may be formed in an outer edge of the substrate; and the inner end lead line and the outer end lead line may be provided from the mounting surface to the exposed surface through the recess.

When the connection patterns are provided on the exposed surface of the substrate, the planar coil can be connected to the connection patterns after assembling the coil unit. This improves workability.

In the coil unit according to this embodiment, connection patterns connected to the inner end lead line and the outer end lead line may be provided on the mounting surface of the substrate.

This makes it unnecessary to provide a recess in the substrate and provide the inner end lead line and the outer end lead line to reach the exposed surface through the recess. Therefore, the coil-receiving housing can be sealed with the substrate.

In the coil unit according to this embodiment, a vacuum attraction hole may be formed through the bottom of the coil-receiving housing. This makes it possible to attract the planar coil to the bottom of the coil-receiving housing under vacuum during assembly, whereby adhesion (contact capability) can be improved.

According to another embodiment of the invention, there is provided a coil unit comprising:

a coil;

a coil-receiving housing having a depression that receives the coil; and a base provided with an electronic component that is electrically connected to the coil, the base being disposed to cover the depression.

According to this embodiment of the invention, since the coil is covered with the coil-receiving housing and the base, the coil of the coil unit is not exposed. Therefore, the coil unit allows easy handling as an electrical component. Moreover, since a hole need not unnecessarily be formed in the coil-receiving housing, the space that receives the coil is covered with the coil-receiving housing and the base so that a foreign object does not enter the coil unit from the outside. Although mounted components and mounting patterns are provided in the inner space of the coil-receiving housing in addition to the coil, an electrical malfunction due to entrance of a metal foreign object rarely occurs.

According to another embodiment of the invention, there is provided an electronic instrument comprising the above coil unit.

Preferred embodiments of the invention are described in detail below. Note that the following embodiments do not in any way limit the scope of the invention defined by the claims laid out herein. Note that all elements of the following embodiments should not necessarily be taken as essential requirements for the invention.

1. Charging System

Figure 1:
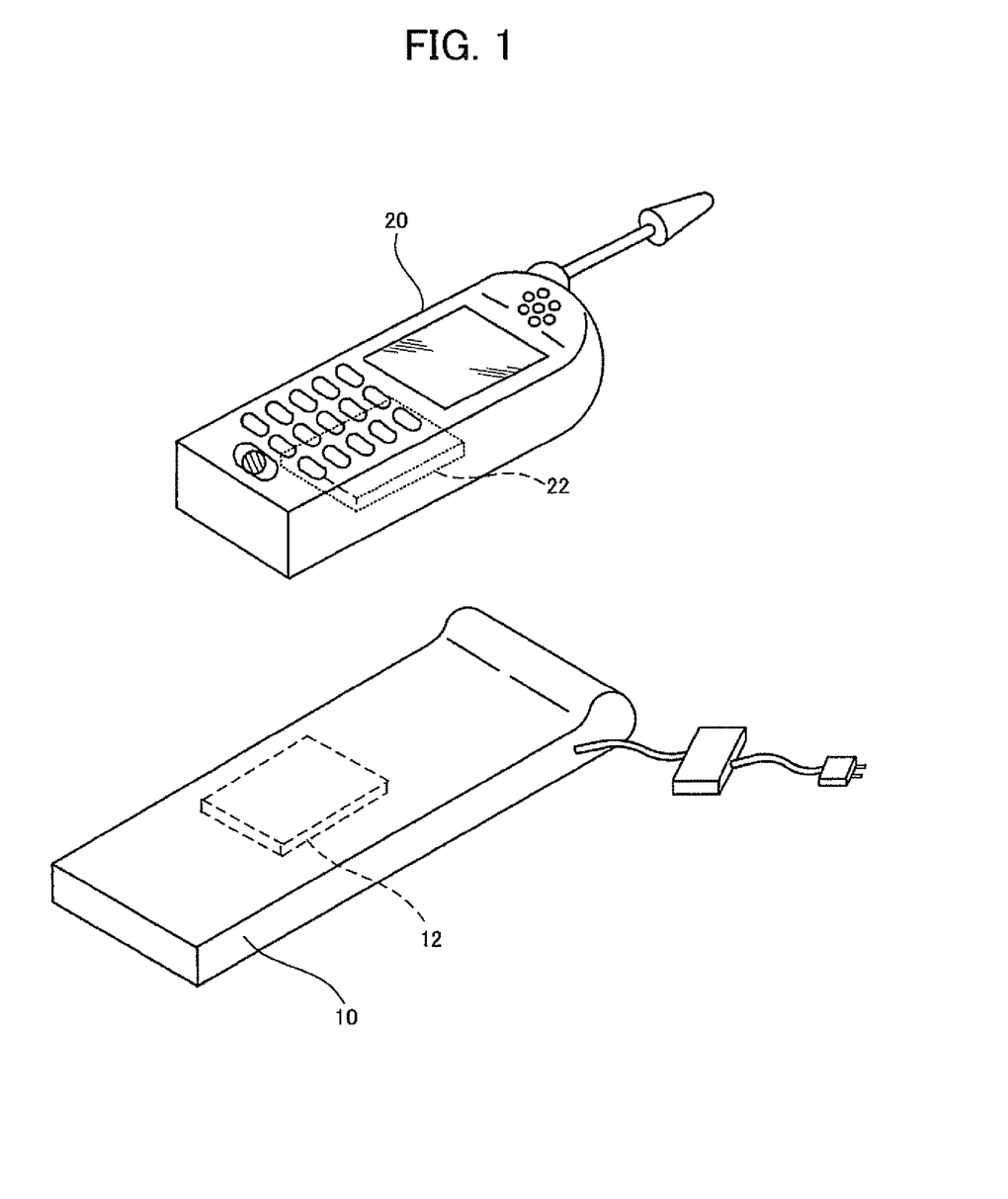
FIG. 1 is a view showing a charging system including a charger and a portable telephone horizontally placed on the charger.

FIG. 1 is a view schematically showing a charging system that includes a charger 10 and a portable telephone 20 (i.e., electronic instrument) charged using the charger 10. FIG. 1 shows a portable telephone 20 which is horizontally placed on a charger 10. The portable telephone 20 is charged using the charger 10 by means of non-contact power transmission utilizing electromagnetic induction that occurs between a coil of a primary coil unit 12 of the charger 10 and a coil of a secondary coil unit 22 of the portable telephone 20.

Opposite sides of the coil units 12 and 22 when performing non-contact power transmission as shown in FIG. 1 are referred to as transmission sides. In FIG. 1, the upper side of the coil unit 12 is the transmission side, and the lower side of the coil unit 22 is the transmission side. The side opposite to the transmission side is referred to as a non-transmission side.

2. Structure of Coil Unit

Figure 2:
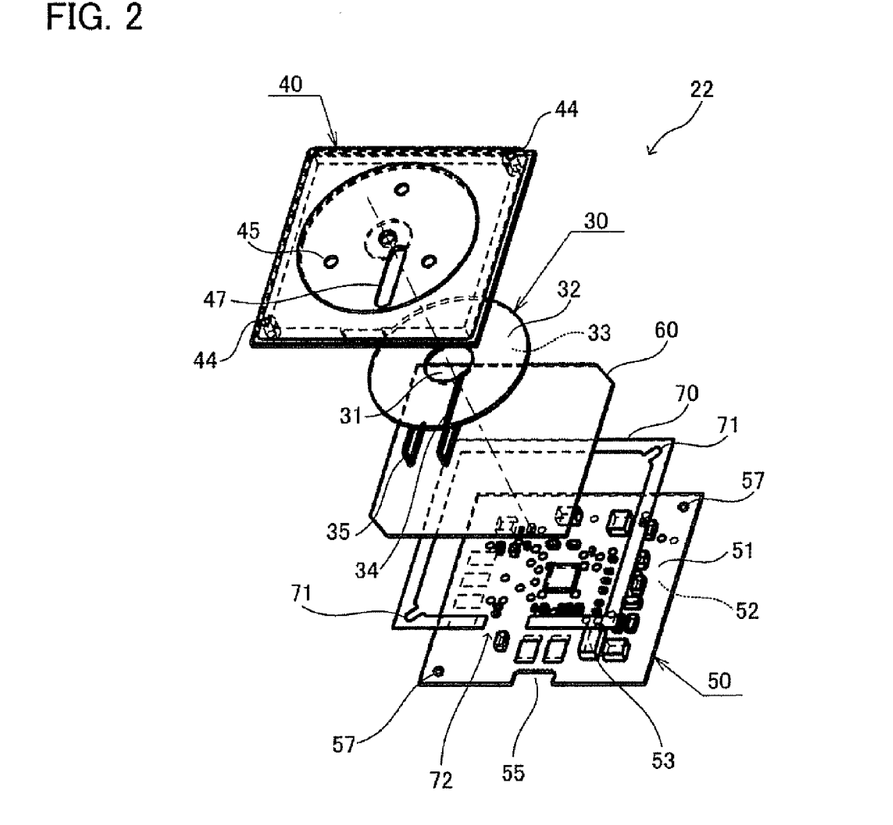
FIG. 2 is an exploded oblique view showing a coil unit used for the charging system shown in FIG. 1.

FIG. 2 is an exploded oblique view showing a structure suitable for the secondary coil unit 22 among the coil units 12 and 22 shown in FIG. 1 for which a reduction in size is particularly desired. Note that the structure shown in FIG. 2 may also be applied to the coil unit 12.

In FIG. 2, the coil unit 22 according to this embodiment is basically configured to include a coil such as a planar coil 30 that has an air-core section 31, a coil-receiving housing 40 that receives the planar coil 30, and a substrate 50 that functions as a lid of the coil-receiving housing 40 that receives the planar coil 30.

In FIG. 2, the coil unit 22 may also include a magnetic sheet 60 disposed on the non-transmission side of the planar coil 30. The planar coil 30 and the magnetic sheet 60 are placed between the coil-receiving housing 40 and the substrate 50. It is preferable that a magnetic shield sheet 62 (see FIG. 5, described later) be stacked on the magnetic sheet 60 on the side that faces the substrate 50. In FIG. 2, a strip-shaped double-sided adhesive tape 70 is used to secure the substrate 50 as the lid of the coil-receiving housing 40, for example.

The planar coil 30 is not particularly limited insofar as the planar coil 30 is a flat (planar) air-core coil. For example, a coil formed by winding a single-core or multi-core coated coil wire in a plane may be used as the planar coil 30.

Figure 3A:
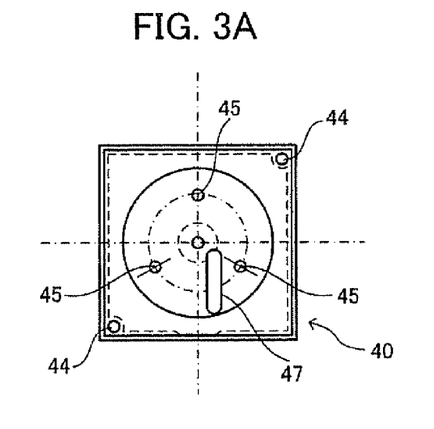
FIG. 3A is a plan view showing a coil-receiving housing.
Figure 3B:
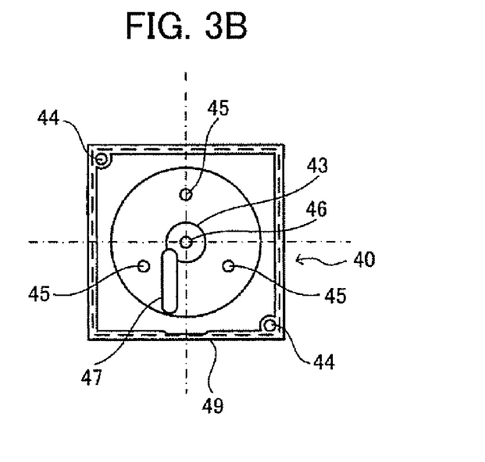
FIG. 3B is a view showing the back side of a coil-receiving housing.
Figure 4:
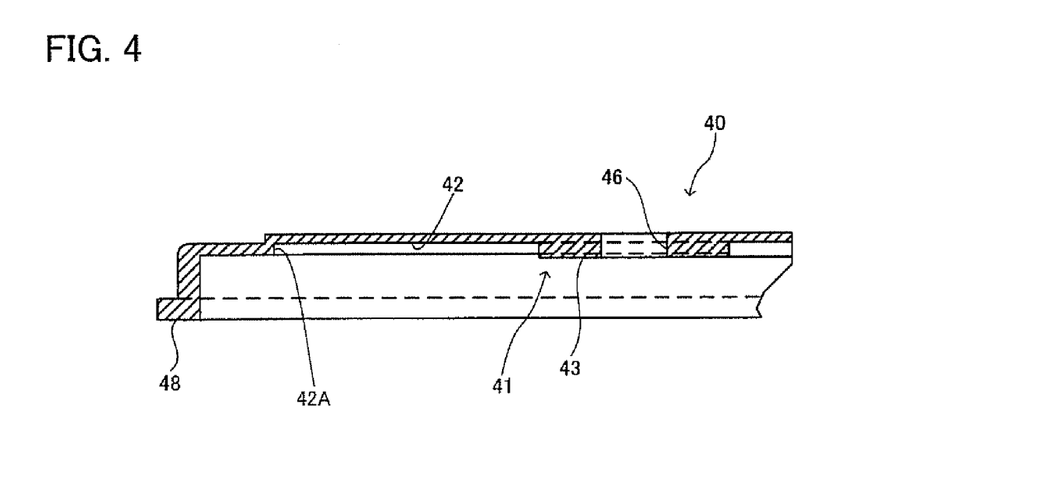
FIG. 4 is a partial cross-sectional view showing a coil-receiving housing.
Figure 5:
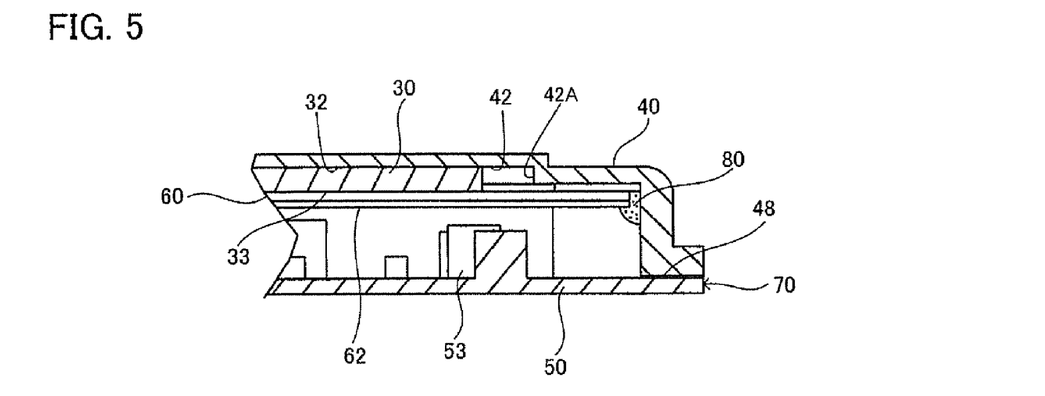
FIG. 5 is a partial cross-sectional view showing a coil unit.

FIG. 3A is a plan view showing the coil-receiving housing, FIG. 3B is a view showing the back side of the coil-receiving housing, FIG. 4 is a partial cross-sectional view showing the coil-receiving housing, and FIG. 5 is a partial cross-sectional view showing the coil unit.

The coil-receiving housing 40 is formed by injection-molding a resin material, for example. As shown in FIG. 4, the coil-receiving housing 40 has a depression 41 that receives the planar coil 30. The planar coil 30 is disposed so that the transmission side of the planar coil 30 faces a bottom 42 of the depression 41, for example. A positioning protrusion 43 is formed at the center of the bottom 42. The planar coil 30 is positioned in the coil-receiving housing 40 by placing the positioning protrusion 43 in the air-core section 31 of the planar coil 30.

The bottom 42 is formed inside a circular step portion 42A. As shown in FIG. 5, the diameter of the step portion 42A is larger than the diameter of the planar coil 30. Note that the step portion 42A need not necessarily be provided.

As shown in FIGS. 3A and 3B, first through-holes 44 are formed at two corners of the coil-receiving housing 40 positioned on a diagonal line, for example. The first through-holes 44 may be used to position the coil-receiving housing 40 with respect to a jig when assembling the coil unit 22, as described later. Second through-holes 45 are formed in the bottom 42 of the coil-receiving housing 40 inside the step portion 42A at three positions, for example. The second through-holes 45 are used to attract the planar coil 30 to the bottom 42 of the coil-receiving housing 40 under vacuum when assembling the coil unit 22, as described later. A third through-hole 46 is formed at the center of the coil-receiving housing 40. The third through-hole 46 functions as a relief for the positioning protrusion 43. The first and third through-holes 44 and 46 may be used as positioning sections when incorporating the coil unit 22 in the portable telephone 20 shown in FIG. 1.

As shown in FIGS. 3A and 3B, a long hole (receiving section in a broad sense) 47 is formed in the bottom 42 of the coil-receiving housing 40 inside the step portion 42A. As shown in FIG. 2, an inner end lead line 34 of the planar coil 30 is provided on a transmission side 32 of the planar coil 30. The long hole 47 receives the inner end lead line 34 provided on the transmission side 32. Therefore, the transmission side 32 of the planar coil 30 can be caused to adhere to the bottom 42 of the coil-receiving housing 40 over the entire transmission side 32 of the planar coil 30, as shown in FIG. 5. As a result, the total height of the coil unit 22 is reduced to contribute to a reduction in thickness. Since the thickness of the bottom 42 of the coil-receiving housing 40 is greater than the thickness of the inner end lead line 34, the inner end lead line 34 is accommodated in the long hole 47 and does not protrude from the long hole 47.

The inner end lead line 34 does not increase the thickness of the coil unit 22 since the inner end lead line 34 is placed in the long hole 47. The receiving section is not limited to the long hole 47 formed through the bottom 42 of the coil-receiving housing 40, but may be a depression which is not formed through the bottom 42 of the coil-receiving housing 40. In this case, an increase in the thickness of the coil unit 22 due to the inner end lead line 34 can still be reduced.

The magnetic sheet 60 shown in FIGS. 2 and 5 is formed to have a size sufficient to cover the planar coil 30. The magnetic sheet 60 receives a magnetic flux from the planar coil 30, and increases the inductance of the planar coil 30. A soft magnetic material is preferably used as the material for the magnetic sheet 60. A soft magnetic ferrite material or a soft magnetic metal material may be used as the material for the magnetic sheet 60.

The magnetic shield sheet 62 may be provided on the side of the magnetic sheet 60 opposite to the side that faces the planar coil 30, if necessary. The magnetic shield sheet 62 absorbs a magnetic flux which has not been absorbed by the magnetic sheet 60. This prevents an adverse effect of a magnetic flux on mounted components 53 provided on the substrate 50 and components provided in the portable telephone 20. The material for the magnetic shield sheet 62 is not particularly limited insofar as the material can absorb a magnetic flux. For example, a non-magnetic material such as aluminum may be used as the material for the magnetic shield sheet 62.

The magnetic sheet 60 and the magnetic shield sheet 62 are stacked through a double-sided adhesive tape or the like. As shown in FIG. 5, the magnetic sheet 60 and the magnetic shield sheet 62 are disposed in the coil-receiving housing 40 so that the magnetic sheet 60 adheres to a non-transmission side 33 of the planar coil 30.

The magnetic sheet 60 and the magnetic shield sheet 62 may be secured on the planar coil 30 or the coil-receiving housing 40 using an adhesive tape (not shown) or the like. As shown in FIG. 5, it is preferable to provide a sealing material 80 (e.g., an adhesive resin material (e.g., silicone) or a molding material) between the inner wall of the depression 41 of the coil-receiving housing 40 and the end of the magnetic shield sheet 62. This enables the end of the magnetic sheet 60 to be covered, or enables a path in which the material (e.g., soft magnetic metal powder) for the magnetic sheet 60 is situated to be sealed. This prevents a situation in which a metal foreign object falls onto a mounting surface 51 of the substrate 50 so that electrical problems such as a pattern short circuit can be prevented. The sealing material 80 has a secondary function of securing the magnetic sheet 60 and the magnetic shield sheet 62 on the coil-receiving housing 40. The inner end lead line 34 and an outer end lead line 35 of the coil are connected to the substrate 50 through the sealing material 80 (these connections are not shown).

As shown in FIG. 2, the substrate 50 (i.e., base) has the mounting surface 51 and an exposed surface 52 opposite to the mounting surface 51. Various mounted components 53 are provided on the mounting surface 51. The substrate 50 is bonded to an open end face 48 of the coil-receiving housing 40 shown in FIG. 5 through a double-sided adhesive sheet 70 to cover the depression 41 of the coil-receiving housing 40. This prevents a situation in which a foreign object reaches the planar coil 30 and the mounting surface 51 of the substrate 50 provided with the mounted components 53. Since the coil unit 22 is covered with the coil-receiving housing 40 and the exposed surface 52 of the substrate 50, handling of the coil unit 22 is facilitated. Moreover, a space that can accommodate the mounted components 53 is provided between the substrate 50 and the magnetic sheet 60 or the magnetic shield sheet 62 (i.e., the mounted components 53 are not exposed).

Figure 6:
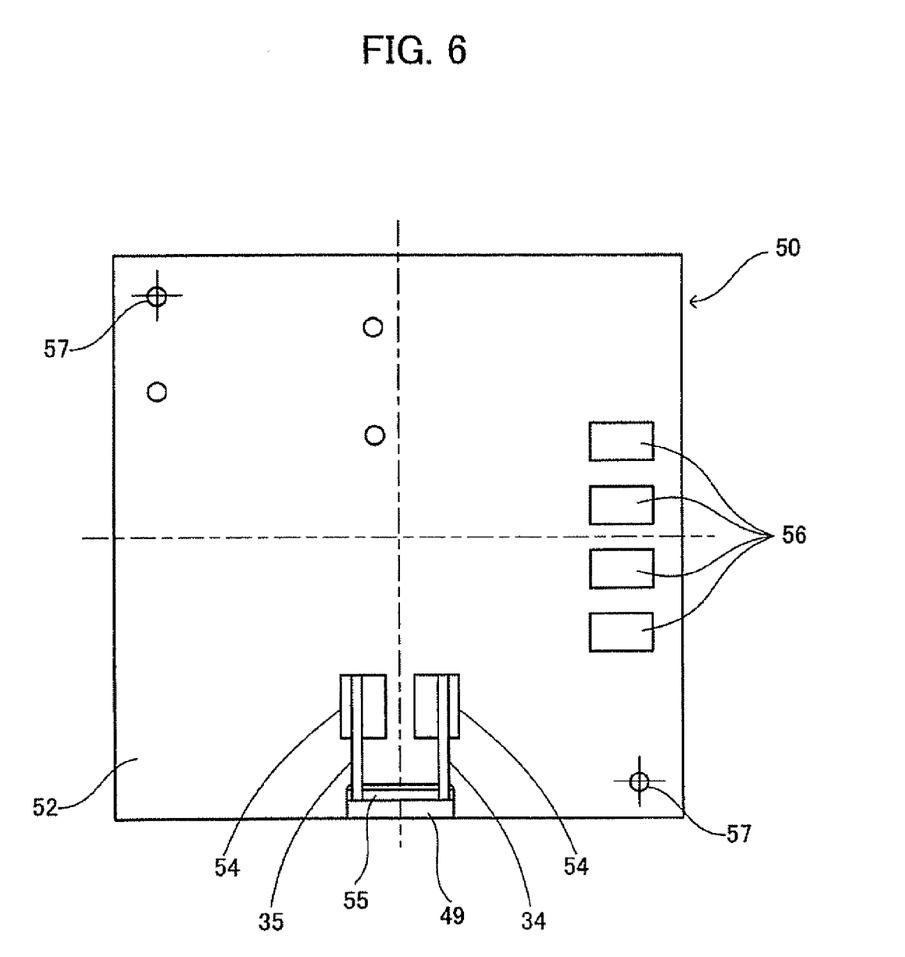
FIG. 6 is a view showing the back side of a coil unit.

FIG. 6 is a view showing the back side of the coil unit 22 (i.e., the exposed surface 52 of the substrate 50). In this embodiment, coil connection pads 54 to which the inner end lead line 34 and the outer end lead line 35 of the planar coil 30 are connected by soldering are provided on the exposed surface 52 of the substrate 50.

A recess 55 for providing the inner end lead line 34 and the outer end lead line 35 of the planar coil 30 from the mounting surface 51 to the exposed surface 52 is provided in part of the edge of the substrate 50. As shown in FIGS. 3B and 6, part of the open end face 48 of the coil-receiving housing 40 is formed as a thin portion 49 at a position corresponding to the recess 55. Therefore, the inner end lead line 34 and the outer end lead line 35 of the planar coil 30 can be provided from the mounting surface 51 to the exposed surface 52 through the recess 55 in the area in which the recess 55 is not covered with the thin portion 49, as shown in FIG. 6. Connection pads 56 are also formed on the exposed surface 52 of the substrate 50 so that the coil unit 22 can be electrically connected to other circuits provided in the portable telephone 20. The connection pads 54 and 56 are connected to a wiring pattern on the mounting surface 51 via through-holes, for example.

Fourth through-holes 57 are formed at two corners of the substrate 50 positioned on a diagonal line at positions corresponding to the first through-holes 44 of the coil-receiving housing 40. Slits 71 are formed in the double-sided adhesive tape 70 at positions corresponding (opposite) to the first and fourth through-holes 44 and 57. Positioning pins of a jig described later are fitted into the second and fourth through-holes and the slits 71.

The strip-shaped double-sided adhesive tape 70 has a cut portion 72 for avoiding interference with the inner end lead line 34 and the outer end lead line 35 of the planar coil 30.

3. Method of Assembling Coil Unit

Figure 7:
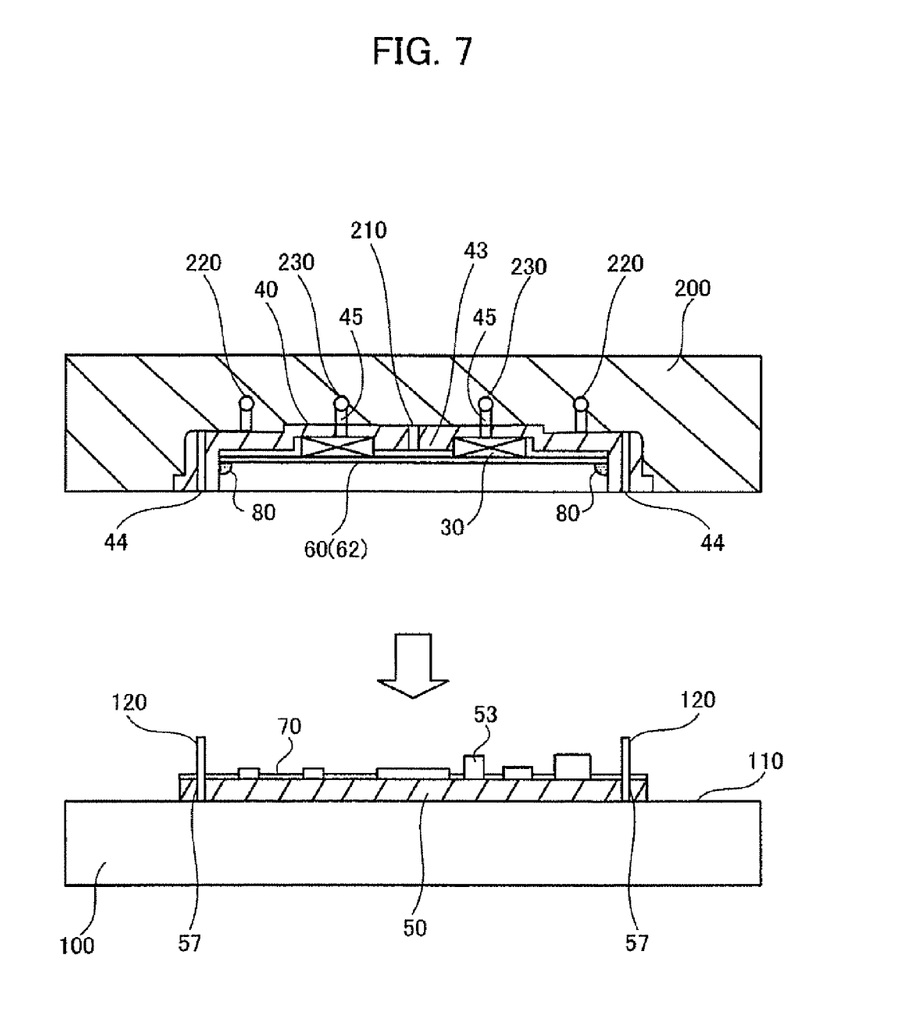
FIG. 7 is a view showing a method of assembling a coil unit.

FIG. 7 shows first and second jigs 100 and 200 for assembling the coil unit 22. The first jig 100 includes two pins 120 that protrude from a substrate placement side 110. The pins 120 of the first jig 100 are inserted into the through-holes 57 of the substrate 50 and the slits 71 of the double-sided adhesive tape 70 so that the substrate 50 and the double-sided adhesive tape 70 are positioned on the first jig 100.

The second jig 200 has a depression 210 that can accommodate the coil-receiving housing 40. The second jig 200 also has first and second vacuum attraction holes 220 and 230. The first vacuum attraction hole 200 is used to attract the coil-receiving housing 40 so that the coil-receiving housing 40 is fitted into the depression 210. The second vacuum attraction holes 230 communicate with the three through-holes 45 of the coil-receiving housing 40. Therefore, the attraction force applied through the second vacuum attraction holes 230 acts on the transmission side 31 of the planar coil 30 through the three through-holes 45 of the coil-receiving housing 40. As a result, when attracting the coil-receiving housing 40 through the first and second vacuum attraction holes 220 and 230 under vacuum, the coil-receiving housing 40 is fitted into the depression 210 of the second jig 200, and the transmission side 31 of the planar coil 30 adheres to the bottom 42 of the coil-receiving housing 40. This prevents an abnormality in assembly (e.g., the planar coil 30 runs onto the positioning protrusion 43 of the coil-receiving housing 40).

After attracting the coil-receiving housing 40 and the planar coil 30 under vacuum, the magnetic sheet 60 and the magnetic shield sheet 62 are secured on the planar coil 30 or the coil-receiving housing 40 using an adhesive tape (not shown). The sealing material 80 (e.g., an adhesive resin material (e.g., silicone) or a molding material) is provided between the inner wall of the depression 41 of the coil-receiving housing 40 and the end of the magnetic shield sheet 62. The first and second jigs 100 and 200 are then moved relatively to each other, whereby the substrate 50 can be secured on the open end face 48 of the coil-receiving housing 40 (i.e., the coil-receiving housing 40 can be covered with the substrate 50) through the double-sided adhesive tape 70.

4. Modification of Coil Unit

Figure 8:
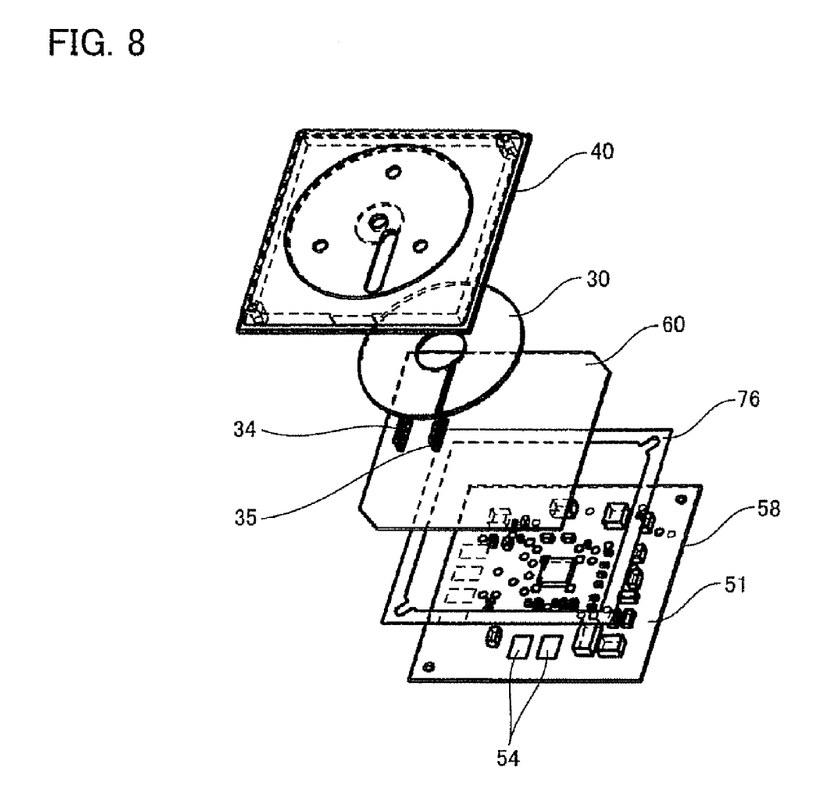
FIG. 8 is an exploded oblique view showing a coil unit according to a modification.
Figure 9:
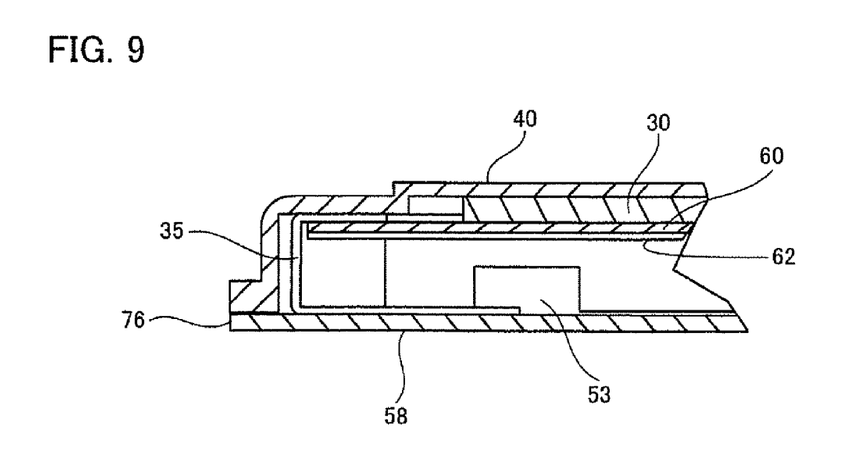
FIG. 9 is a partial cross-sectional view showing a coil unit according to a modification.

FIGS. 8 and 9 show a coil unit differing from the coil unit according to the above-described embodiment. A substrate 58 used for the coil unit according to this embodiment differs from the substrate 50 according to the above-described embodiment in that the coil connection pads 54 to which the inner end lead line 34 and the outer end lead line 35 of the planar coil 30 are connected by soldering are provided on the mounting surface 51 provided with the mounted components 53. Note that a substrate provided with the coil connection pads 54 on both of the mounting surface 51 and the exposed surface 52 (i.e., the substrates 50 and 58 are combined) may also be used.

In this embodiment, the inner end lead line 34 and the outer end lead line 35 of the planar coil 30 need not be provided from the mounting surface 51 to the exposed surface 52. Therefore, the substrate 58 shown in FIG. 8 need not have the recess 55 which is provided in the substrate 50 shown in FIG. 2. Moreover, the open end face 48 of the coil-receiving housing 40 shown in FIGS. 3B and 6 used in this embodiment need not be partially formed as the thin portion 49 at a position corresponding to the recess 55. Note that a coil-receiving housing in which the thin portion 49 is formed may be used in this embodiment in order to use a common coil-receiving housing 40. Moreover, a double-sided tape 76 used in this embodiment need not have the cut portion 72 shown in FIG. 2.

FIG. 9 shows a routing of the outer end lead line 35 of the coil. The outer end lead line 35 of the coil reaches the mounting surface 51 of the substrate 58 through an opening between the coil-receiving housing 40, the magnetic sheet 60, and the magnetic shield sheet 62 (through the sealing material 80 when the sealing material 80 is provided), and is connected to the coil connection pattern 54 (see FIG. 8). According to this embodiment, the open end of the coil-receiving housing 40 can be completely sealed with the substrate 58. This increases the effect of preventing entrance of a foreign object. Moreover, since the exposed surface 52 of the substrate 58 as a component of the coil unit is made flat, handling of the component is facilitated. Note that it is necessary to connect the inner end lead line 34 and the outer end lead line 35 to the coil connection patterns 54 on the mounting surface 51 of the substrate 58 inside the coil-receiving housing 40.

5. Application Example of Electronic Instrument

The above-described embodiments may be applied to an electronic instrument which performs power transmission or signal transmission. For example, the above embodiments may be applied to a charging target including a secondary battery (e.g., wristwatch, electric toothbrush, electric shaver, cordless telephone, personal handyphone, mobile personal computer, personal digital assistant (PDA), or power-assisted bicycle) and a charger.

The coil-receiving housing 40 may be exposed as part of a housing of an electronic instrument. This is effective for reducing the distance between the primary coil and the secondary coil, whereby the transmission efficiency is improved. In this case, when it is desirable that the inner end coil lead line 34 is not exposed in the long hole 47, a tape or the like which covers the long hole 47 may be provided.

Although only some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention. Any term cited with a different term having a broader meaning or the same meaning at least once in the specification and the drawings can be replaced by the different term in any place in the specification and the drawings.

The above embodiments have been described taking an example relating to non-contact power transmission. Note that the invention may be similarly applied to non-contact signal transmission utilizing an electromagnetic induction principle.

Although only some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention.

For example, the invention may be applied to various coils (e.g., a coil having a magnetic material core) in addition to the planar air-core coil.

What is claimed is:

1. A coil unit comprising:
   a planar coil;
   a coil-receiving housing having a depression that receives the planar coil, the planar coil being disposed in the coil-receiving housing so that a transmission side of the planar coil faces a bottom surface of the depression of the coil-receiving housing;
   a substrate having a mounting surface that is provided with a mounted component and that faces a non-transmission side of the planar coil, an inner end lead line and an outer end lead line of the planar coil being connected to the substrate, the substrate being secured as a lid of the coil-receiving housing on an open end side of the depression of the coil-receiving housing, and the coil-receiving housing including
   a receiving section that is part of the coil-receiving housing and that houses the inner end lead line provided on the transmission side of the planar coil so as to reduce an increase in the thickness of the coil unit due to the inner end lead line.

2. The coil unit as defined in claim 1,
   the planar coil having an air-core section; and
   the coil-receiving housing having a positioning protrusion that positions the air-core section of the planar coil.

3. The coil unit as defined in claim 1,
   the coil unit further including a magnetic sheet disposed on the non-transmission side of the planar coil,
   the planar coil and the magnetic sheet being placed between the coil-receiving housing and the substrate.

4. The coil unit as defined in claim 3,
   the coil unit further including a magnetic shield sheet, the magnetic shield sheet being stacked on the magnetic sheet on a side that faces the mounting surface of the substrate.

5. The coil unit as defined in claim 3,
   a sealing material being provided between an outer edge of the magnetic sheet and an inner wall of the coil-receiving housing; and
   the inner end lead line and the outer end lead line of the planar coil being connected to the substrate through the sealing material.

6. The coil unit as defined in claim 1,
   connection patterns connected to the inner end lead line and the outer end lead line being provided on an exposed surface of the substrate opposite to the mounting surface;
   a recess being formed in an outer edge of the substrate; and
   the inner end lead line and the outer end lead line being provided from the mounting surface to the exposed surface through the recess.

7. The coil unit as defined in claim 1,
   connection patterns connected to the inner end lead line and the outer end lead line being provided on the mounting surface of the substrate.

8. The coil unit as defined in claim 1,
   a vacuum attraction hole being formed through the bottom of the coil-receiving housing.

9. An electronic instrument comprising the coil unit as defined in claim 1.

10. A coil unit comprising:
    a planar coil;
    a coil-receiving housing having a depression that receives the planar coil;
    a base provided with an electronic component that is electrically connected to the planar coil, an inner end lead line and an outer end lead line of the planar coil being connected to the base, the base being disposed to cover the depression of the coil-receiving housing, and the coil-receiving housing including
    a receiving section that is part of the coil-receiving housing and that houses the inner end lead line that is provided on a transmission side of the planar coil so as to reduce an increase in the thickness of the coil unit due to the inner end lead line.

11. An electronic instrument comprising the coil unit as defined in claim 10.

* * * * *